United States Patent
Dietrich

(10) Patent No.: US 6,854,761 B2
(45) Date of Patent: Feb. 15, 2005

(54) AIRBAG SYSTEM FOR A MOTOR VEHICLE

(75) Inventor: Guenter Dietrich, Freiberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 105 days.

(21) Appl. No.: 10/215,193

(22) Filed: Aug. 9, 2002

(65) Prior Publication Data

US 2003/0042713 A1 Mar. 6, 2003

(30) Foreign Application Priority Data

Aug. 11, 2001 (DE) .......................................... 101 39 593

(51) Int. Cl.[7] .............................................. B60R 21/16
(52) U.S. Cl. ...................... 280/732; 280/728.2; 280/752
(58) Field of Search .......................... 280/728.2, 728.3, 280/732, 748, 751, 752

(56) References Cited

U.S. PATENT DOCUMENTS

| 5,209,519 | A | * | 5/1993 | Shiga et al. ............. 280/728.2 |
| 5,295,707 | A | | 3/1994 | Satoh et al. |
| 5,342,082 | A | | 8/1994 | Kriska et al. ........... 280/728 A |
| 5,395,133 | A | * | 3/1995 | Lauritzen et al. ........... 280/732 |
| 5,405,163 | A | | 4/1995 | Amamori et al. ....... 280/728 A |
| 5,425,550 | A | * | 6/1995 | Paxton et al. ............ 280/728.3 |
| 5,505,484 | A | | 4/1996 | Miles et al. |
| 5,533,747 | A | * | 7/1996 | Rose ........................ 280/728.2 |
| 5,718,447 | A | * | 2/1998 | Rose et al. .............. 280/728.2 |
| 5,791,684 | A | * | 8/1998 | Repp et al. ................. 280/732 |
| 6,279,942 | B1 | | 8/2001 | Bossenmaier et al. ... 280/728.2 |
| 6,336,652 | B1 | * | 1/2002 | Turnbull et al. .......... 280/728.3 |
| 6,349,965 | B1 | * | 2/2002 | Heilig ........................ 280/748 |

FOREIGN PATENT DOCUMENTS

| DE | 43 08 693 A1 | 9/1993 | |
| EP | 0 728 628 A2 | 8/1996 | |
| EP | 0823353 A1 | 2/1998 | ........... B60R/21/20 |
| EP | 1000816 A2 | 5/2000 | ........... B60R/21/20 |

* cited by examiner

Primary Examiner—David R. Dunn
(74) Attorney, Agent, or Firm—Crowell & Moring LLP

(57) ABSTRACT

The airbag system for a motor vehicle extends below a dashboard and exhibits a generator housing, which is aligned in the transverse direction of the motor vehicle and which forms a blast channel for an airbag between integrated walls and adjoining separate face-sided walls. In load position at least one integrated wall of the blast channel can be displaced in the downward direction. In a first integrated channel wall of the generator housing a head impact element can be swiveled unilaterally in bearings; and in a starting position the head impact element can be suspended by means of a compression connection in the second integrated channel wall of the housing and can be disconnected in a load position. The connections can comprise semi-form-fit connections or springy connections.

11 Claims, 6 Drawing Sheets

AIRBAG SYSTEM FOR A MOTOR VEHICLE

This application claims the priority of German Patent Document No. 101 39 593.0, filed Aug. 11, 2001, the disclosure of which is expressly incorporated by reference herein.

BACKGROUND AND SUMMARY OF THE INVENTION

The invention relates to an airbag system for a motor vehicle.

EP 0 728 628 A2 discloses an airbag system, which has a generator housing with walls for a blast channel of an airbag. A front wall of the blast channel is formed by two single walls, which are detachably connected and can be separated from each other in the event of a head impact or a load.

An object of the invention is to provide an improved airbag system for a motor vehicle that allows simple installation in the vehicle and an unimpeded and guided lowering of a channel wall of the blast channel in the event of a head impact or a load.

The object is achieved with the embodiments of the invention described and claimed hereinafter.

One of the advantages of the invention is that owing to the use of a head impact element, which can be pivoted on the generator housing, it can be immediately lowered and swiveled without hindrance in the event of a load. Thus, injuries to the head of a motor vehicle occupant are largely avoided. To this end, in a first channel wall of the generator housing, which is aligned in relation to the motor vehicle occupant, a head impact element can be swiveled unilaterally in bearings. In a second channel wall of the housing, located below, the head impact element can be suspended in a starting position by a compression connection and can be unfastened in the event of a load.

The head impact element comprises a U-shaped bow with legs, which are mounted on the first channel wall of the housing and are connected by a web element. The web element forms an additional upper channel wall, which includes, as the connection, a receiving flute for engaging a molded on hook-shaped bar on the second channel wall of the housing. The bow can react directly in the event of a head impact. Delays caused, for example, by a deformation, are avoided.

The connection between the head impact element and the second channel wall of the generator housing can be designed as a form-fit connection. For example, the second channel wall of the housing may have a hook-shaped bar, the receiving flute of the head impact element may have a configuration that matches the configuration of the hook-shaped bar.

Furthermore, a raised retaining crease of the head impact element is also conceivable according to the invention. The retaining crease is held form-fittingly against an impressed receiving crease in the second channel wall of the generator housing The cross section of the receiving crease is approximately W-shaped with two stop creases. An upper edge of the wall of the generator housing is bent outwardly. Correspondingly with the receiving crease, the retaining crease of the upper channel wall is held clampingly against the receiving crease.

Furthermore, at least one elastic spring element is also possible according to the invention. The spring may be disposed between the head impact element and the wall of the generator housing and is compressed in the event of a head impact. The wall of the head impact element can be lowered in the event of a load.

In an embodiment of the invention, in the event of a head impact the upper channel wall of the head impact element can be swung about an approximately horizontal swivel axis in relation to the stationary second channel wall of the generator housing. In the event of a load it can be swung in the downward direction, thus undoing the form-fit connection. In this way, the head of a motor vehicle occupant does not strike a stationary edge of a blast channel wall, but rather this hard edge moves or swings in the event of a load to reduce the impact. Furthermore, the impact is also decreased by disconnecting the connection between the head impact element and the wall of the generator housing.

The generator housing is held on the face-sided brackets by fasteners, which are connected rigidly to a carrier of the motor vehicle body by bolted angle brackets. The connection to the carrier is relatively inflexible, so that all loads, like vibrations, are absorbed during the blast and there is no deformation upon head impact.

Angle brackets, by which the airbag system is fastened deformably to a switchboard of the motor vehicle, are connected to the generator housing. This additional deformation of the angle brackets further reduces impact. In addition, the plastic deformation is used to allow deformation at the switchboard.

Because of the arrangement of the web of the head impact element in a plane with the wall of the generator housing, a flat blast channel is formed that has virtually smooth walls. In the event of a load the upper channel wall of the head impact element is braced against the second channel wall of the generator housing.

The face-sided walls of the blast channel are formed by the legs of the head impact element and by the brackets, thus resulting in an additional common face-sided channel wall that is continuous and pulled up at the corners.

Owing to the design of the invention, a good guide of the airbag and a fast ejection of the airbag in the event of a load is achieved. Furthermore, to reduce the magnitude of head impact in the area of the switchboard, a slightly deformable blast channel is provided. To fulfill these two requirements, the invention provides that the blast channel has two pieces. These two pieces have the special advantage that even the corner regions of the blast channel are dulled. Now in the event of a load, even the corner regions can be loaded with a force and give way so that there are no longer any tension spikes.

Other objects, advantages and novel features of the present invention will become apparent from the following detailed description of the invention when considered in conjunction with the accompanying drawings.

DETAILED DESCRIPTION OF THE DRAWINGS

Figure 1:
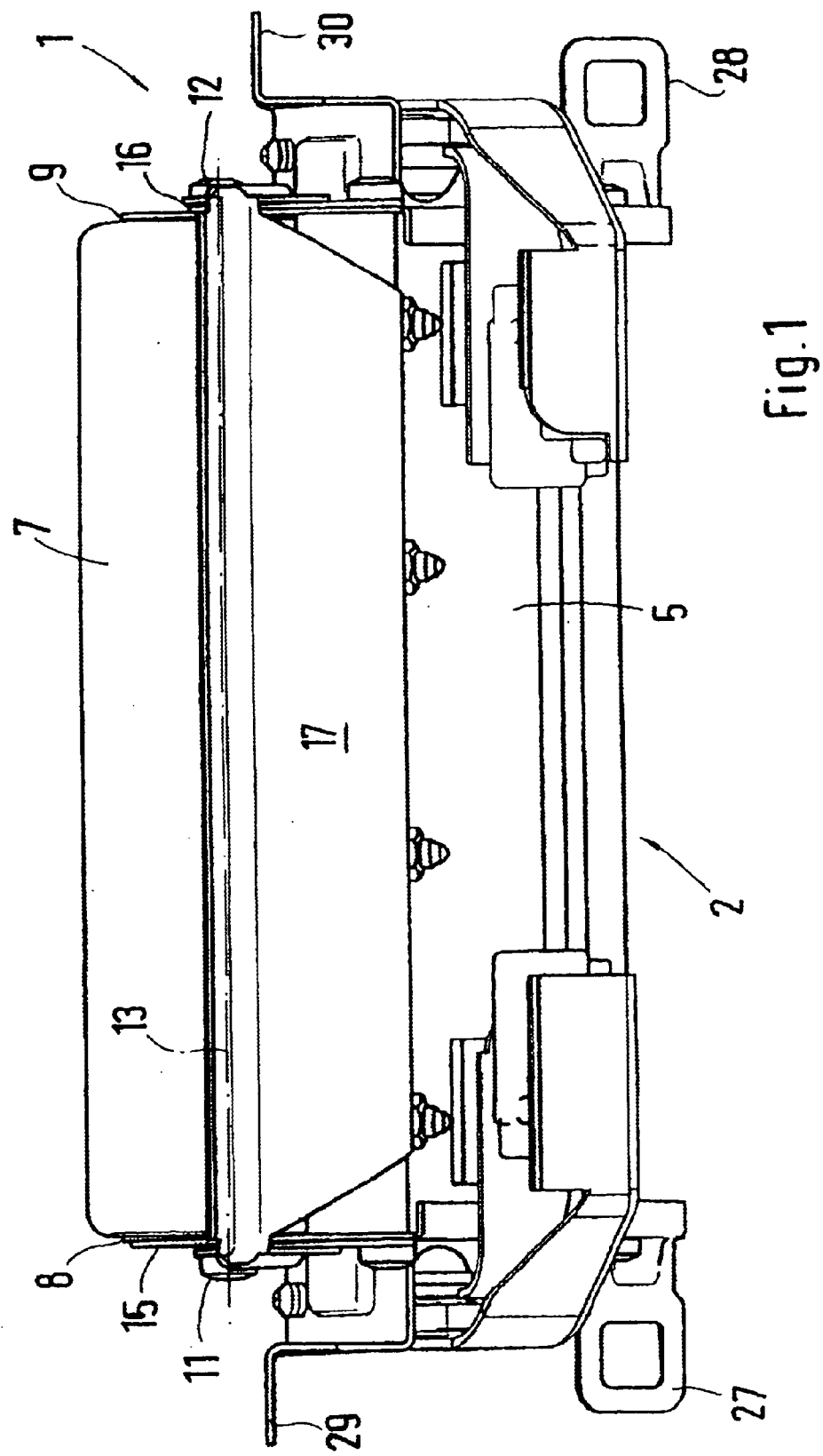
FIG. 1 is a front view of a module of an airbag system.
Figure 2:
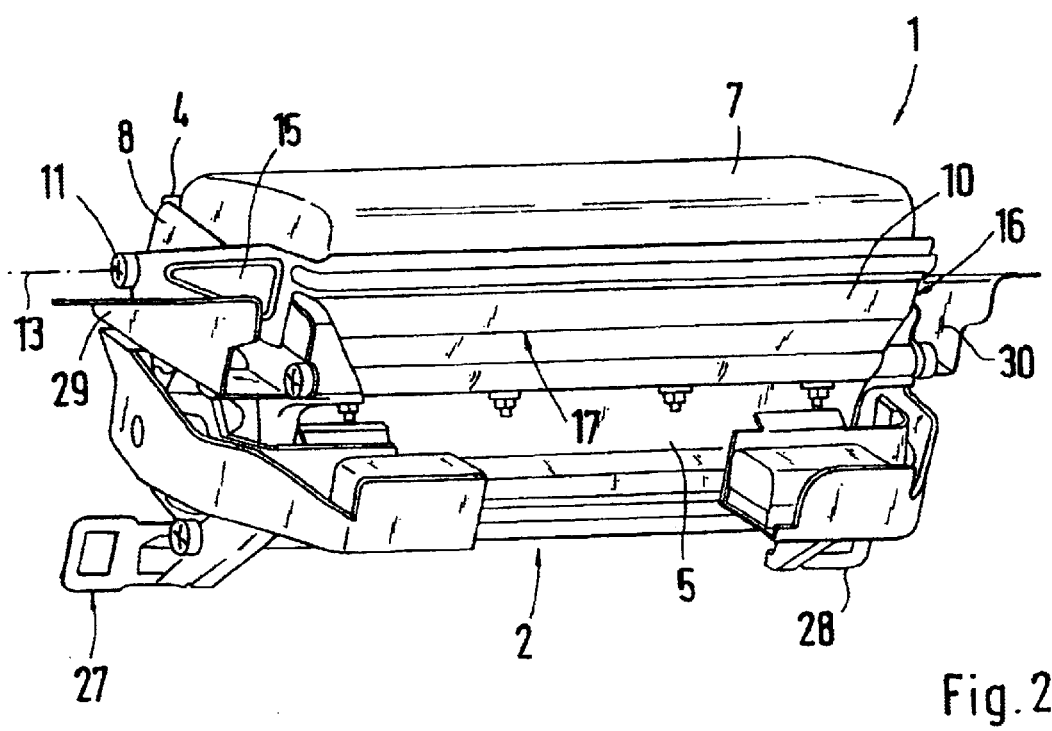
FIG. 2 is a schematic drawing of the airbag system, according to FIG. 1.
Figure 5:
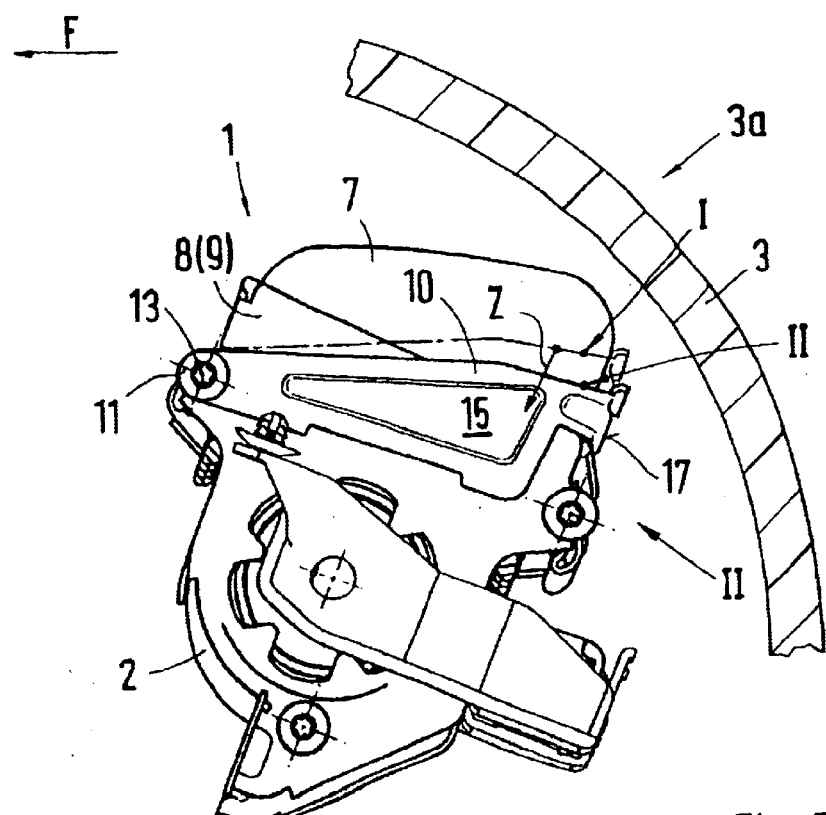
FIG. 5 is a front view of the airbag system in starting and load position.

As shown in FIGS. 1–5, an airbag 1 of the present invention comprises a generator housing 2, which may be arranged in the transverse direction in the motor vehicle below a cover 3 of a switchboard 3a or the passenger compartment of the motor vehicle (see FIG. 5). This housing 2 has a molded-on first integrated rear wall 4 and a molded-on second front wall 5, with respect to the travel direction F of the motor vehicle, for forming a blast channel 6 for an airbag 7. This blast channel 6 is closed on the face side of the system 1 by brackets 8, 9. As shown in FIGS. 1 and 2, a head impact element 10 is connected to the generator housing 2 so as to pivot about a swivel axis 13 in bearings 11, 12.

Figure 4:
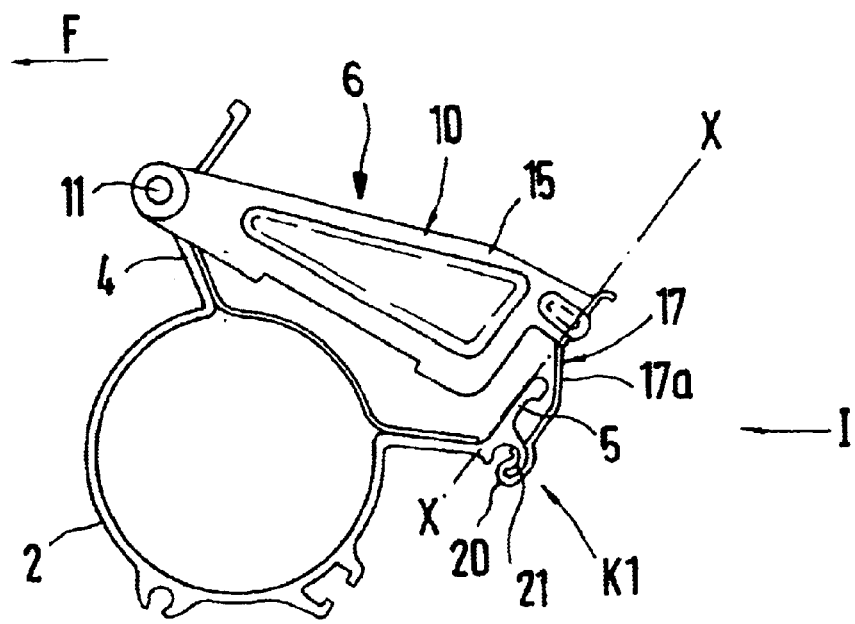
FIG. 4 is a schematic drawing of the airbag system with generator housing and head impact element, according to FIG. 3.
Figure 7:
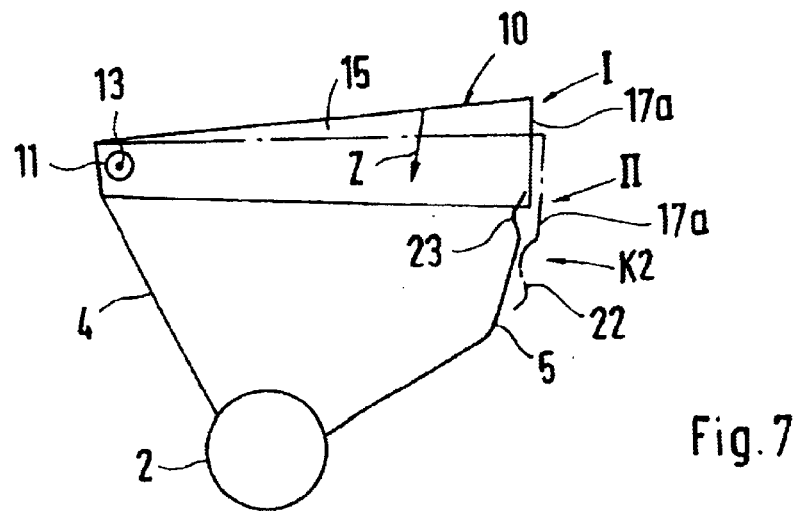
FIG. 7 is another design of a connection with a clamping device, comprising creases, between the wall of the generator housing and the wall of the head impact element.
Figure 8:
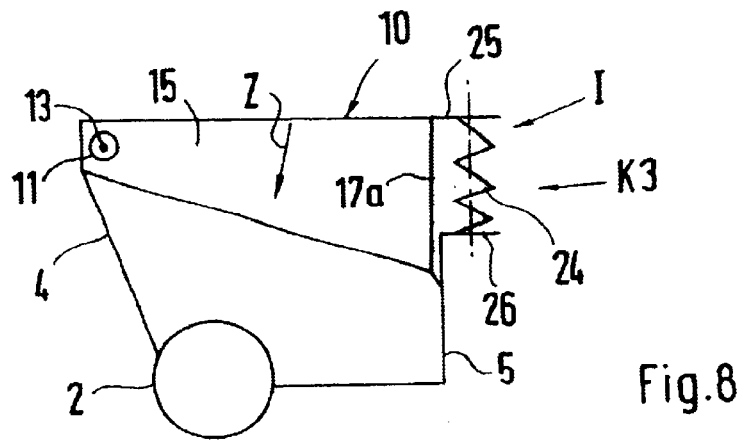
FIG. 8 is another design of a connection with a spring element between the wall of the generator housing and the wall of the head impact element.
Figure 9:
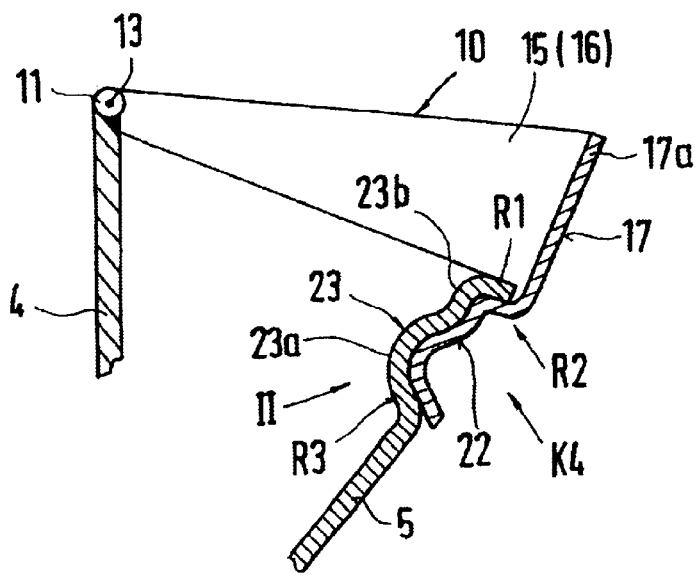
FIG. 9 is another design, according to FIG. 7 with a receiving and retaining fastener.

The head impact element 10 comprises a U-shaped bow with side legs 15, 16, whose ends are pivotably connected to the rear wall 4 of the generator housing 2 by means of the bearings 11, 12. These legs 15, 16 are connected to each other with a web member 17, which forms an additional upper channel wall 17a with respect to the second front channel wall 5 of the generator housing 2 (see FIGS. 4 and 5). These two walls 5 and 17a are connected to each other by a connection K1, K2, K3, K4. In a starting position I the connection K1, K2, K4, shown in FIG. 4, 7 or 9, is detachably connected, but can be quickly disconnected. The connection K3 shown in FIG. 8 is spring elastic. In a load position II, swiveling the head impact element 10 downward in the Z direction of the arrow causes the connection K1, K2, K4, shown in FIG. 4, 7 or 9, to be disconnected or released. The connection K1 between the front channel walls 5 and 17a is made by a semi-form-fit connection between a receiving flute 20 in the wall 5 and a corresponding hook-shaped bar 21 in the wall 17a.

The cross section of the receiving flute 20 of the wall 5 has an arched receiving mouth, in which the corresponding hook-shaped bar 21 of the wall 17a is held in the starting position I. In the event of a load (load position II) or a head impact, the hook-like bar 21 unfastens itself from the receiving flute 20.

According to another embodiment shown in FIG. 7 or 9, the connection K2, K4 between the wall 5 of the generator housing 2 and the wall 17a of the head impact element 10 comprises a crease 22, which is raised in the wall and engages with an impressed crease 23 of the wall 5 of the generator housing 2. In the event of a load II, during which the head impact element 10 swings, the crease 22 disconnects itself from the crease 23, and the head impact element can be lowered in the direction of the wall 5.

As shown in FIG. 9, the cross section of the receiving crease 25 in the wall 5 has an approximately W-shape with two distinct stop creases. The two edges R1 and R2 of the receiving crease 23 are outwardly oriented. Corresponding with the receiving crease 23, the retaining crease 22 of the head impact element 10, also has a W-shaped cross section, with two corresponding stop seats. The edge R1 of the receiving crease 23 forms an upper stop, and the retaining crease 22 has a locked segment R2 which engages the locked edge segment R1.

According to another embodiment shown in FIG. 8, the connection K3 between the wall 5 of the generator housing 2 and the wall 17a of the head impact element 10 comprises a spring element 24 or several spring elements 24. The spring elements 24 are arranged, for example, between the stops 25 and 26 of the head impact element 10 and the wall 5.

In both the embodiment in FIG. 7 and the embodiment in FIG. 8, in the event of a head impact the head impact element 10 is swung downward in the Z direction of the arrow about the swivel axis 13 so that the wall 17a of the head impact element 10 moves outside or inside with respect to the wall 5 of the generator housing 2.

The airbag system 1 is fastened to the carrier of the body structure by face-sided brackets 8, 9, which are connected to the generator housing 2 by fasteners. The brackets 8, 9 are attached to the carrier(s) by bolted angle brackets 27, 28. In general, the connection of the brackets 8, 9 with the carrier is inflexible and rigid. In contrast, the connection between the fasteners 29, 30 of the system 1 and the switchboard or the passenger compartment is deformable and absorbs impact.

Figure 6:
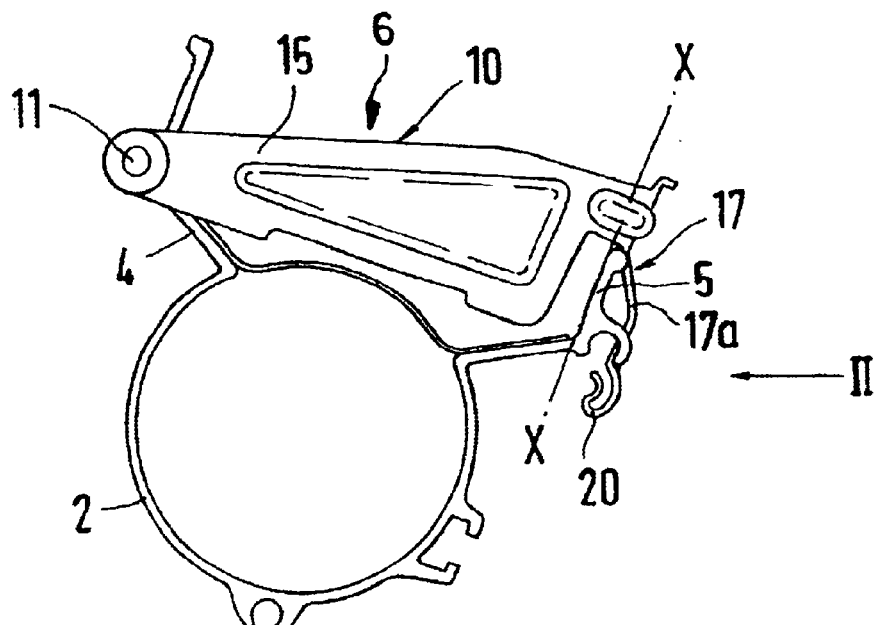
FIG. 6 is a schematic drawing of the airbag system with generator housing and head impact element, according to FIG. 5.

As shown in FIGS. 4 and 6, the front channel walls 5 and 17a of the blast channel for the airbag 7 complement each other in such a manner that in about the starting I and load II position they are arranged approximately in a common plane X—X so that the airbag 7 is not impeded in its motion. In the load position II, according to FIG. 6, the upper channel wall 17a can brace itself against the bottom channel wall 5 in one area.

Figure 3:
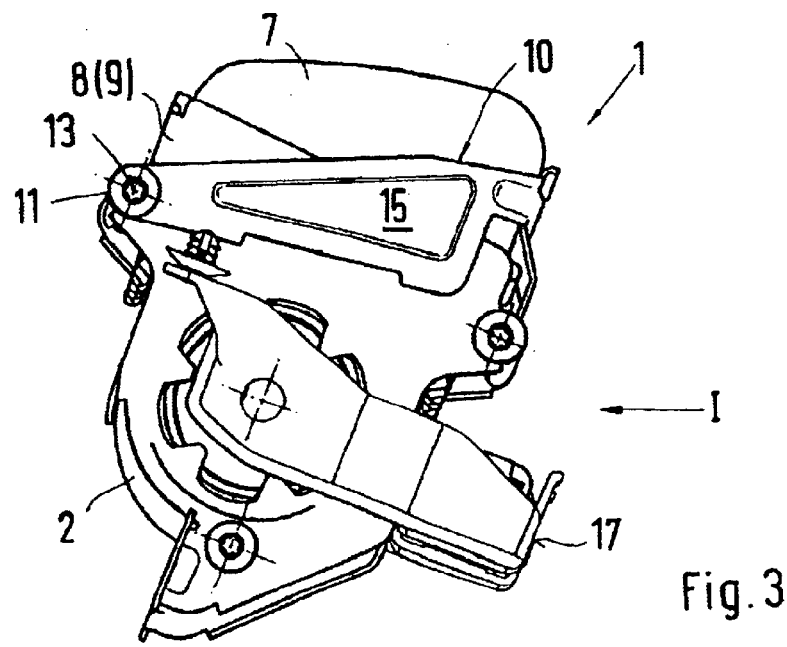
FIG. 3 is a front view of the airbag system in installation position.

As shown in FIGS. 3 and 6, the brackets 8 and 9 complement one another with the legs 14 and 15 of the head impact element 10 in order to form a blast channel with raised corners.

Figure 10:
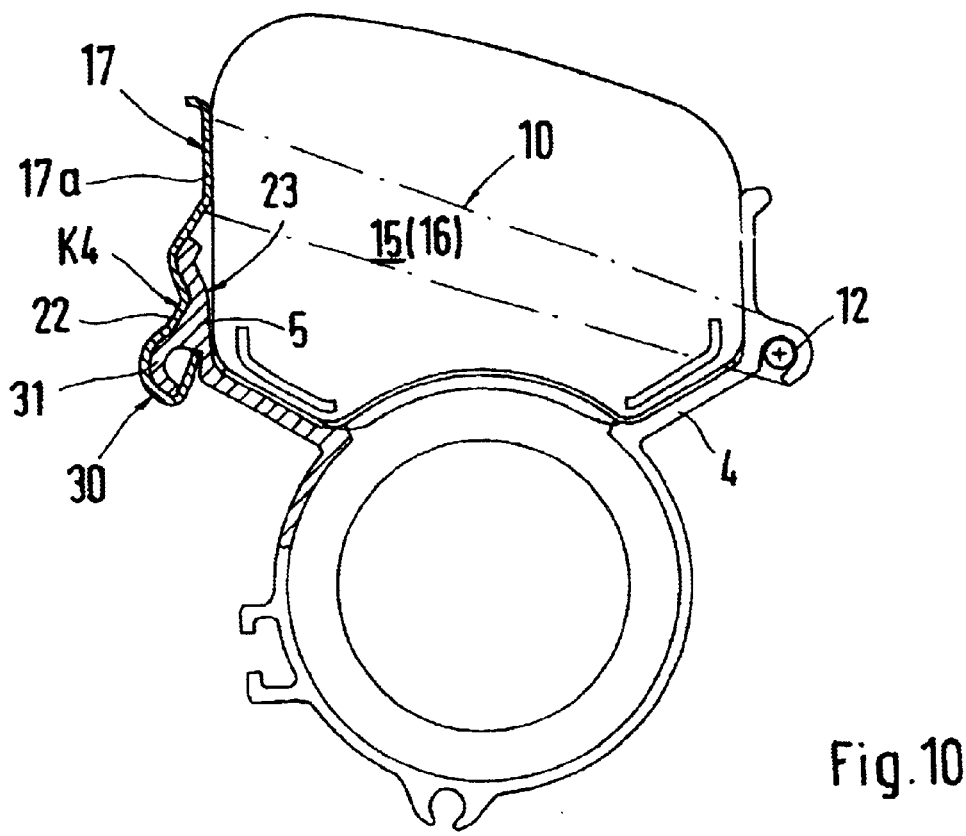
FIG. 10 is another design of the head impact element with a retaining fastener.
Figure 11:
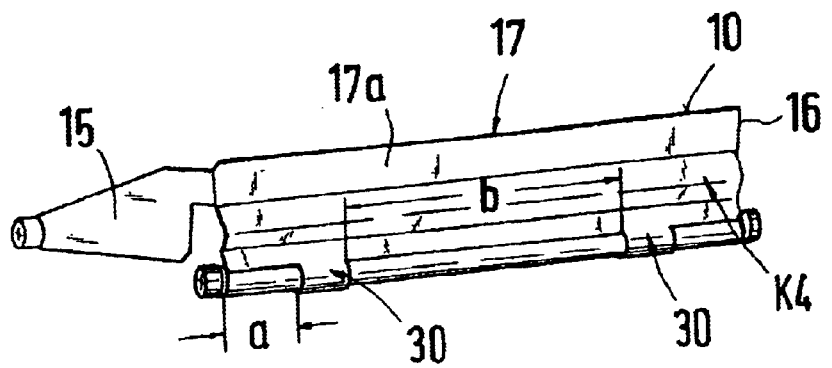
FIG. 11 is a view of the retaining fastener, according to FIG. 10.

In the embodiment shown in FIGS. 10 and 11, the web 17 between the two legs 15, 16 of the head impact element 10 has at least two installation suspension eyes 30, which are spaced apart at a distance b. Between these eyes 30 and above these eyes 30 is the actual connection K4 of the web member 17 with the channel wall 5. This connection K4 comprises, as shown in FIG. 9, the receiving crease 23 and the retaining crease 22. As shown in FIG. 11, the suspension eyes 30 are arranged at a distance from the end of the head impact element 10, and there is a distance b between the two suspension eyes 30. The eyes 30 are provided solely for securing at the head impact element 10, whereas the connection K4 brings about the actual friction work in the event of a head impact.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. An airbag system for a motor vehicle, the system comprising:

a generator housing including,
   first and second integrated channel walls, and
   a head impact element pivotably mounted to the first integrated channel wall, the head impact element having a starting position and a load position, wherein in the starting position the head impact element is suspended in and connected to the second integrated channel wall by a connection, and in the load position the head impact element is disconnected from the second integrated channel wall wherein the head impact element comprises a U-shaped bow, the bow having a web element and two legs connected by the web element, the web element including an additional upper channel wall, and the legs being pivotably mounted on the first channel wall, wherein in the event of a load the additional upper channel wall of the head impact element pivots downwardly in relation to the stationary second channel wall from the starting position to the load position, thus disconnecting the connection, and wherein the web has a raised retaining crease, wherein the second integrated channel wall has an impressed receiving crease, wherein in the starting position the retaining crease engages the receiving crease to form the connection between the head impact element and the second integrated channel wall, and wherein in the load position the retaining crease is swung out of the receiving crease to disconnect the head impact element from the second integrated channel wall.

2. The system of claim 1, wherein the cross section of the receiving crease is W-shaped and has two stop creases, wherein the second integrated channel has an upper edge that is bent outwardly, and wherein at the starting position the retaining crease of the additional upper channel wall is held securely to rest against the receiving crease.

3. The system of claim 1, wherein the edge of the receiving crease includes an upper stop, and the retaining crease includes a locked segment that is braced at the upper edge of the second integrated channel in the starting position.

4. The system of claim 1, wherein the web element of the head impact element includes at least two separate installation suspension eyes, and wherein the retaining crease is between the suspension eyes and is aligned with the receiving crease so as to form fit.

5. An airbag system for a motor vehicle, the system comprising:
   a generator housing including,
      first and second integrated channel walls,
      a head impact element pivotably mounted to the first integrated channel wall, the head impact element having a starting position and a load position, wherein in the starting position the head impact element is suspended in and connected to the second integrated channel wall by a connection, and in the load position the head impact element is disconnected from the second integrated channel wall, and
      angle brackets, which deformably connect the generator housing to a switchboard of the motor vehicle.

6. An airbag system for a motor vehicle, the system comprising:
   a generator housing including,
      first and second integrated channel walls, and
      a head impact element pivotably mounted to the first integrated channel wall, the head impact element having a starting position and a load position, wherein in the starting position the head impact element is suspended in and connected to the second integrated channel wall by a connection, and in the load position the head impact element is disconnected from the second integrated channel wall, wherein the head impact element comprises a U-shaped bow, the bow having a web element and two legs connected by the web element, the web element including an additional upper channel wall, and the legs being pivotably mounted on the first channel wall, and wherein in the starting position the second channel wall and the additional upper channel wall are arranged approximately in a common plane.

7. An airbag system for a motor vehicle, the system comprising:
   a generator housing including,
      first and second integrated channel walls, and
      a head impact element pivotably mounted to the first integrated channel wall, the head impact element having a starting position and a load position, wherein in the starting position the head impact element is suspended in and connected to the second integrated channel wall by a connection, and in the load position the head impact element is disconnected from the second integrated channel wall, wherein the head impact element comprises a U-shaped bow, the bow having a web element and two legs connected by the web element, the web element including an additional upper channel wall, and the legs being pivotably mounted on the first channel wall, and wherein in the load position the additional upper channel wall of the head impact element is braced against the second channel wall of the generator housing.

8. An airbag system for a motor vehicle, the system comprising:
   a generator housing including,
      first and second integrated channel walls, and
      a head impact element pivotably mounted to the first integrated channel wall, the head impact element having a starting position and a load position, wherein in the starting position the head impact element is suspended in and connected to the second integrated channel wall by a connection, and in the load position the head impact element is disconnected from the second integrated channel wall, and wherein the head impact element comprises a U-shaped bow, the bow having a web element and two legs connected by the web element, the web element including an additional upper channel wall, and the legs being pivotably mounted on the first channel wall; and
   face-sided brackets, wherein the generator housing is held on the face-sided brackets by fasteners, and the face-sided brackets are connected rigidly to a carrier of the motor vehicle body by bolted angle brackets, and wherein the legs of the head impact element reach from the outside over the face-sided brackets, and the legs and the brackets form complementary, joint face-side channel walls of the generator housing.

9. The system of claim 8, wherein the first and second integrated channel walls are made from aluminum extended parts.

10. An airbag system for a motor vehicle, the system comprising:

a generator housing including,
  first and second integrated channel walls,
  a head impact element including a web and two legs connected by the web, the head impact element further including a starting position and a load position, the web including a front channel wall having stops, the web further including an elastic spring element that is braced between the stops of the front channel wall and the second channel wall, and wherein in the load position the front channel wall of the head impact element is displaced and the spring element is elastically compressed.

11. A method of making an airbag system including a generator housing having first and second integrated channel walls, the method comprising:
  pivotably mounting a head impact element to the first integrated channel wall, wherein the head impact element has a starting position and a load position; and
  placing an elastic spring element between the head impact element and the second channel wall, wherein in the load position the head impact element is displaced and the spring element is elastically compressed.

* * * * *